LOW ENERGY CODE SIGNALING USING ERROR CORRECTING CODES

Filed Dec. 5, 1962 7 Sheets-Sheet 1

INVENTOR
P. M. DOLLARD
BY G. E. Kersey
ATTORNEY

LOW ENERGY CODE SIGNALING USING ERROR CORRECTING CODES

Filed Dec. 5, 1962 7 Sheets-Sheet 2

LOW ENERGY CODE SIGNALING USING ERROR CORRECTING CODES

Filed Dec. 5, 1962 7 Sheets-Sheet 3

LOW ENERGY CODE SIGNALING USING ERROR CORRECTING CODES

Filed Dec. 5, 1962 7 Sheets-Sheet 4

May 31, 1966 P. M. DOLLARD 3,254,325

LOW ENERGY CODE SIGNALING USING ERROR CORRECTING CODES

Filed Dec. 5, 1962 7 Sheets-Sheet 5

May 31, 1966 P. M. DOLLARD 3,254,325

LOW ENERGY CODE SIGNALING USING ERROR CORRECTING CODES

Filed Dec. 5, 1962 7 Sheets-Sheet 6

LOW ENERGY CODE SIGNALING USING ERROR CORRECTING CODES

Filed Dec. 5, 1962 7 Sheets-Sheet 7

RECEIVED GROUP OF SIX 4-BIT CODE WORDS AT RECEIVER WITH THREE BITS IN ERROR IN CODE WORD NO. 2

CORRECTLY RECEIVED GROUP OF SIX 4-BIT CODE WORDS AT RECEIVER WITH RESULTING ERROR-PATTERN WORDS

GROUP OF FOUR 4-BIT CODE WORDS PLUS TWO 4-BIT DERIVED CHECK WORDS AT TRANSMITTER

United States Patent Office 3,254,325 Patented May 31, 1966

3,254,325

LOW ENERGY CODE SIGNALING USING ERROR CORRECTING CODES

Peter M. Dollard, Whippany, N.J., assignor to Bell Telephone Laboratories, Incorporated, New York, N.Y., a corporation of New York Filed Dec. 5, 1962, Ser. No. 242,452
11 Claims. (Cl. 340—146.1)

This invention relates to code signaling in the presence of disturbances, particularly when only low levels of signaling energy are available.

During signaling, items of information are conveyed from a transmitter to a receiver over a communications channel. Because of inevitable disturbances on the channel, an information bearing wave arriving at the receiver will differ from its originally generated counterpart. Nevertheless, it is possible to represent, i.e., code, the items of information in such a way as to reduce the effects of the disturbances on the recovery of the information.

In the context of signaling, it is customary to represent an item of information by a binary digit, i.e., a so-called "bit" admitting of one of two possible values, typically "0" and "1." This is because the transfer of information assumes significance only when there is some uncertainty in the system. And the simplest possible form of uncertainty is a choice between two possible conditions.

Of course, for informational situations with more than two conditions, a binary digit, taken alone, is inadequate. However, each such situation can be represented by a group of binary digits that are said to constitute a code word. For example, where there are eight different informational situations, each can be represented by a code word of three bits since $2^3=8$.

Since each bit admits of one of two possible values, it is a simple matter to represent it electrically, e.g., by a pulse signal for a "1" or by the absence of a pulse signal for a "0." The recovery of coded information ordinarily entails a determination of whether a "1" or a "0" has been received.

As long as the average signaling power is sufficient compared with average power of disturbance effects introduced by a transmission channel, the determination can be made correctly most of the time. Of course, no matter what the signaling power level, it will be exceeded occasionally by the disturbance level, giving rise to errors. Nevertheless, many of the errors can be located and corrected in well-known fashion when redundant bits have been added to the code words. Thus, as discussed in Patent 2,552,629, issued to R. W. Hamming et al. on May 15, 1951, and reissued on December 23, 1952, as Re. 23,601, an informational situation requiring three bits can be corrected with respect to a single error in one of those bits if they are accompanied by three extra bits.

Although the probability of error in recovered information can be decreased as redundancy is increased, the signaling energy required per bit of information is increased since for unchanged available power the average number of information bits in a unit time is decreased. Alternatively, as the signaling power is reduced the probability of error increases unless there is a corresponding change in the redundancy of the code. But added redundancy again means that the energy per bit of transmitted information has increased.

Accordingly, it is an object of the invention to increase signaling efficiency when signaling power is limited. A related object is to achieve a low probability of error without the equipment complexity of error correcting codes with high degrees of redundancy. Another object is to increase the utility of error correcting codes.

To accomplish the foregoing and related objects, the invention provides for the intermediate coding of error correcting groups of code words into sequences of channel symbol signals. Each code word, composed of several items or bits of information, is represented uniquely by a channel symbol signal having a selected characteristic which is made to occur at a predetermined point in time within the time interval occupied by the code word. The selected characteristic could, for example, be a voltage peak. Thus to represent uniquely $n$ different code words each having a duration T, a corresponding family of $n$ channel symbol signals is generated such that the characteristic voltage of the $i$th channel symbol signal occurs at a corresponding predetermined time $i(T/n)$ seconds during the interval T. In this way, each of the channel symbols replaces a multiplicity of bits in an error correcting code word. Further, because the channel symbols are uniformly distributed in time, they may be considered as representing uniformly distributed points in vector space. For example, an error correcting code containing 49 information bits and 14 error correcting bits is converted into nine channel symbols representing seven bits each.

At a receiver the symbol signals are examined on a unit, instead of on a bit-by-bit, basis. As a result and because of the equiseparation of the channel symbols in vector space, the most probable counterpart of each originally transmitted code word is recovered, after which ordinary error-correcting decoding can be used to reduce the probability of error still further.

Because the probability of error in channel symbol signaling can be made small by concentrating the transmission energy at the voltage characteristic which distinguishes one channel symbol from another, any error that does arise is generally confined to an occasional one of the channel symbol signals. Consequently, with regard to the error-correcting signals replaced by a channel symbol signal received in error, the error effect resembles that produced by bursts of noise in conventional code signaling. Accordingly, the error-correcting code used with the invention is desirably of a kind capable of correcting burst errors. However, since conventional burst-error codes that are easily implemented have a low informational efficiency, the invention further provides a special and readily implemented error-correcting code. The latter is tailored to the error effect associated with the channel symbol signals to achieve a significant increase in informational efficiency. In general, such a code is in use in any burst-error situation for which the bursts are confined within a preassigned grouping of code signals.

In one example of an error-correcting code serving to enhance informational efficiency, code words carrying information are arranged in a matrix from which supplemental check bits are derived from its rows and columns. Thus, 49 informational bits, constituting a succession of code words, can be arranged in a matrix of seven rows and seven columns whose columns and diagonals yield two check words of seven bits each. The resulting informational efficiency is much greater than that of typical conventional error-correcting codes, being in the ratio of 49 to 63, i.e., 7 to 9 as compared to the ratio 5 to 15 required by the coding arrangement proposed by M. G. Nicholson et al. in Patent 3,093,707, issued June 11, 1963, and the ratio of approximately 4 to 7 in the coding arrangement proposed by R. W. Hamming et al. in Patent 2,552,629, issued May 15, 1951, and reissued December 23, 1952 as Re. 23,601.

Other aspects of the invention will become apparent after considering several illustrative embodiments taken in conjunction with the drawings, in which.

Figure 1:
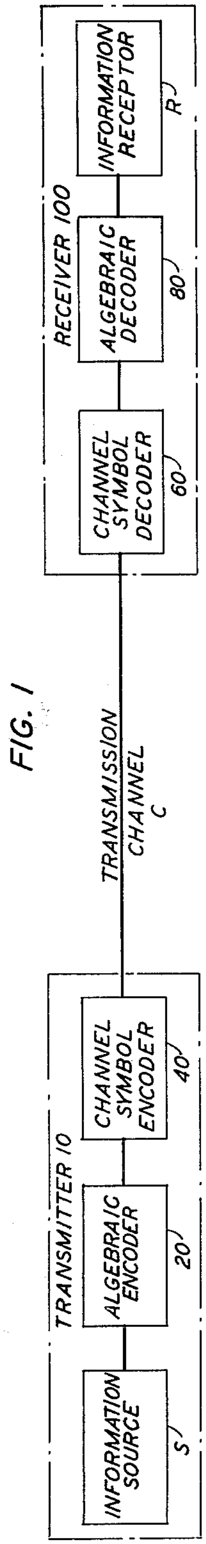
FIG. 1 is a block diagram of a low energy signaling system in accordance with the invention.

As shown by FIG. 1, the invention employs two tandem-connected encoders 20 and 40 at a transmitter 10 and two counterpart decoders 60 and 80 at a receiver 100. Information derived from a source S and processed by the encoders is dispatched to the decoders over a transmission channel C and made suitably available to an information receptor R. By virtue of the composite coding and decoding provided in accordance with the invention, low energy information signals arriving at the receptor are relatively free from disturbance effects introduced on the channel.

The first encoder 20 at the transmitter converts information from the source into error-correcting groups of code signals representing information signals supplemented by error-correcting signals. Such a group of signals can be manipulated in algebraic fashion at the algebraic decoder 80 to correct errors introduced during transmission. Hence, the encoder is designated "algebraic." Evidently the number of correctable errors is governed by the extent to which the informational signals are supplemented by error-correcting signals. In general, algebraic coding and decoding is based upon the teachings of Hamming and Holbrook, supra, providing for the derivation, from an information bearing wave, of an informational set of two-valued pulse signals that are supplemented by a second, error-correcting set of two-valued pulse signals.

For reasons that will become apparent shortly, an algebraic code for use with the invention is desirably capable of correcting errors which occur in clusters, i.e., so-called burst errors. A particularly suitable algebraic code provided by the invention is obtained by arranging the information bits in a matrix and deriving column and diagonal check bits from them. The derivation of the check bits is considered in detail in conjunction with the illustrative encoder of FIG. 5A and the illustrative information bit matrix of FIG. 5B. Briefly, in a typical example of such a code, 49 information bits, $b_1$ through $b_{49}$, derived from seven source words of seven bits each are arranged in a matrix from which two error-correcting words of seven bits each are obtained from the columns and diagonals of the matrix—making 63 bits in all.

Figure 3A:
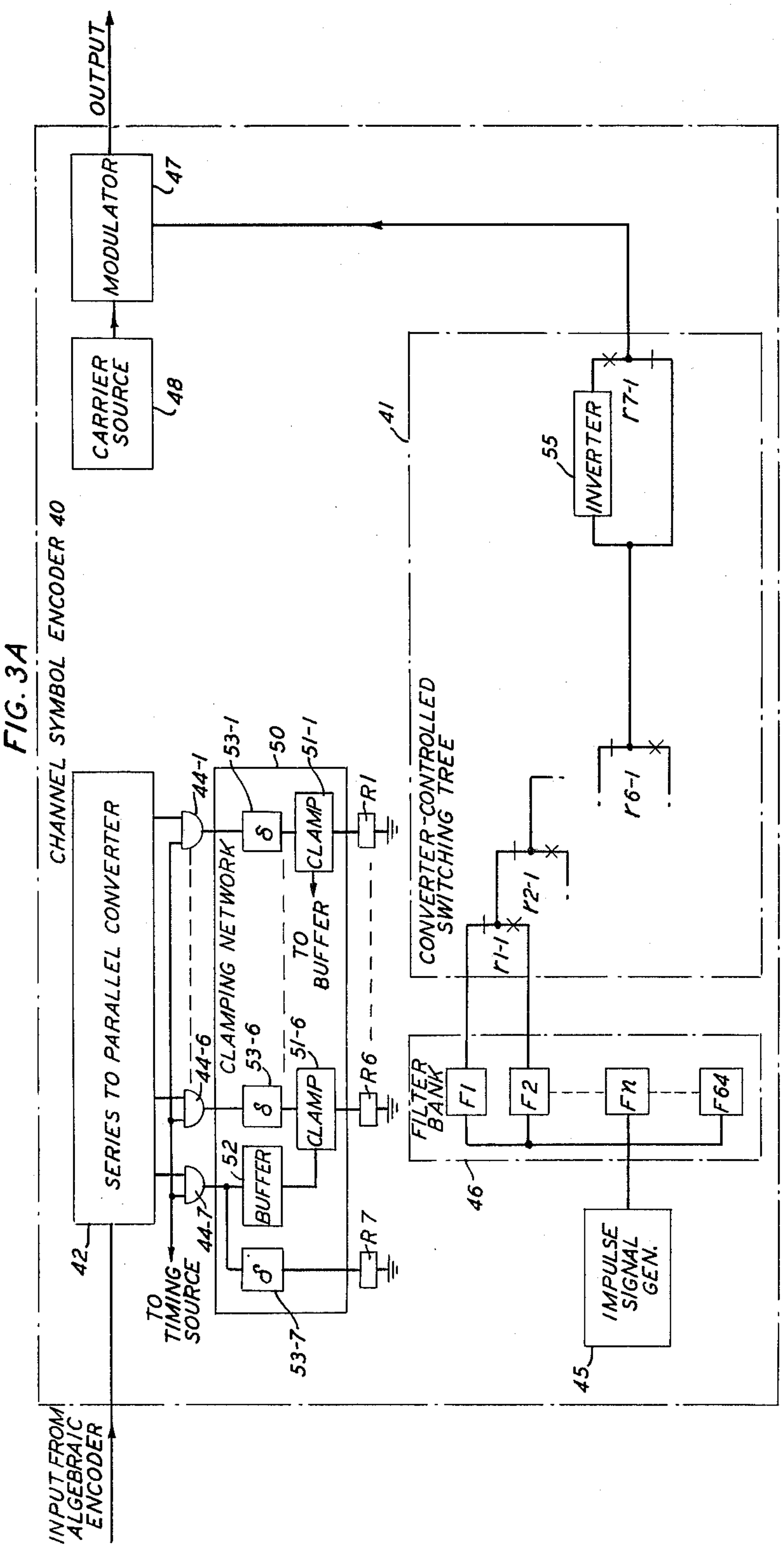
FIG. 3A is a block and schematic diagram of a channel symbol encoder for the system of FIG. 1.

Once derived, each group of algebraic code signals is applied to a channel symbol encoder 40 whose detailed operation is advantageously that of the illustrative encoder of FIG. 3A. From an over-all standpoint the channel symbol encoder operates by converting each group of code signals into a sequence of channel symbol signals, with each symbol substituted for a prescribed number of bits in the original error-correcting code. For example, a 63-bit algebraic code group can become a sequence of nine channel symbols, each representing seven bits.

The channel symbols are desirably chosen from a coding dictionary whose entries can be represented by uniformly distributed points on a surface in vector space. In addition, when it is advantageous for the symbols to be representable by equi-energy signals, the points representing them are equidistant from the origin of the space. Geometrically, each point is at the terminus of the segment, i.e., a vector, that extends from an arbitrary origin to a surface in the space.

Figure 2:
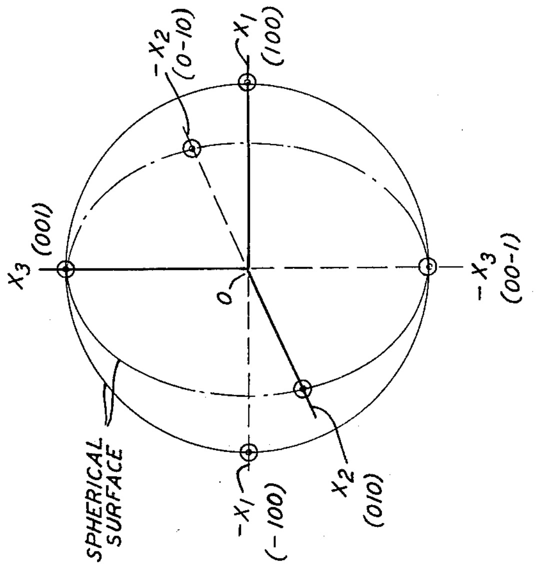
FIG. 2 is a three-dimensional vector space diagram setting forth the locations of suitable channel symbol code points for the system of FIG. 1.

In a three-dimensional space with the "biorthogonal" configuration illustrated by FIG. 2, such points lie at the intersections of a spherical surface with the coordinate axes $X_1$, $X_2$, and $X_3$ defining the space. Since each axis defines positive and negative regions with respect to the origin O, such a three-dimensional space contains six code points 100, 010, 001, –100, 0–10, and 00–1. The code points thus obtained are said to be biorthogonal because their vectors form two sets whose constituent members are mutually perpendicular. When each channel symbol replaces seven bits of an error-correcting code, the required dimensionality of a biorthogonal set becomes 64 since any group of seven bits may represent any one of 128 possible informational situations and there are two symbols, one positive, the other negative, for each spatial dimension.

When the channel symbols are so chosen, a signal representing a code point and subject to disturbances can, nonetheless, be correctly identified despite the disturbances as long as the point corresponding to the disturbed signal remains geometrically closer to the correct code point than to any other.

Hence, by contrast with the code groups produced by the algebraic encoder 20, the channel symbols are said to be geometric since their correct identification in the presence of disturbances is based upon geometric, rather than algebraic, considerations.

In the case of channel symbols based upon a biorthogonal code the distinguishing characteristics of each symbol occupies one out of 64 time scale positions during the time interval of the error-correcting code group that it replaces; however, this does not mean that signal-wise each symbol is merely a pulse. For reasons to be explained shortly, the waveform of a biorthogonal channel symbol signal, as a function of time, is approximated by the sync $t$ function which is commonly designated sin $t/t$.

After being transmitted to the receiver 100, the biorthogonal channel signals are acted upon by a channel symbol decoder 60 and then by an algebraic decoder 80. The channel symbol decoder converts each incoming channel symbol signal into an error-correcting group of code signals.

Unlike conventional decoders, which operate on a bit-by-bit basis, the channel symbol decoder 60 examines the entire time interval of a channel symbol signal, corresponding to $n$ bit intervals, where $n$ is the number of bits in each code word, before making a decision as to which code symbol was most likely sent from the transmitter. Hence, the initial decisional process of the decoder relies upon all of the information contained in the interval occupied by the symbol signal, rather than on the piecemeal information represented by single bits. This fact, coupled with the special geometric properties of a channel symbol code, contributes to the recovery of the information with a low probability of error.

A further reduction in the probability of error is subsequently achieved by the second stage of decoding which is algebraic. The algebraic decoder 80 correlates the informational bits of the $n$ bit code words derived by decoder 60 with associated check bits. Wherever there is a failure of correlation, an "algebraic" error-correction process is brought into operation.

Turning now to a more specific description of the system in FIG. 1, first consideration will be given to the channel symbol encoder 40 since there are several well-known algebraic encoders that are suitable for use with the invention, e.g., those disclosed by D. Slepian, in U.S. Patent No. 2,926,215, which issued on February 23, 1960, and by D. W. Hagelbarger, in U.S. Patent No. 2,956,124, which issued on October 11, 1960.

As shown in FIG. 3A, the channel symbol signals of a biorthogonal code, in which each symbol represents seven bits of an error-correcting code group, are generated by controlling the settings of switches $r_{1-1}$ through $r_{7-1}$ forming a switching tree 41.

The control signals for the switches are obtained from a series-to-parallel converter 42 that is connected to the algebraic encoder 20 of FIG. 1. Since each channel symbol replaces seven bits of an algebraic code, the converter has seven taps that energize respective relays $R_1$ through $R_7$. In addition, for reasons to be discussed shortly, a clamping network 50 is provided for six of the relays.

The particular combination of relays energized depends upon the particular code word in the converter 42 at the time that the converter AND gates 44–1 through 44–7 are enabled from a timing source (not shown). During gating of the AND gates 44–1 through 44–7 an impulse generator 45 applies its output signal to a bank of filters 46. Since each biorthogonal code symbol is derived from seven bits of information, it may represent any one of 128 different informational situations so that there are 128 different symbols all together, of which one-half are negative. Hence, six of the relays $R_1$ through $R_6$ control the paths of the switching tree 41 connected to sixty-four filters $F_1$ through $F_{64}$ and the seventh relay $R_7$ is used to determine sign.

For example, when the binary code word in the series to parallel converter 42, from left to right, is 0000001, it corresponds to the second of 128 possible informational situations the first being 0000000. In terms of a channel symbol, such a code is represented by the intersection of a surface with an axis in a vector space of 64 dimensions.

One way of generating the associated channel symbol signal is by energizing relay $R_1$ of the converter 42, closing the normally open contacts, designated by an "$x$," of an associated transfer switch $r_{1-1}$. As a result, there is a through path from the second filter $F_2$ of the bank 46 through the transfer $r_{1-1}$ to a modulator 47, at which the output of the filter $F_2$ is applied to a carrier signal generated by a source 48.

The various individual filters $F_1$ through $F_{64}$ of the bank 46 are designed with progressively increasing delays, according to well-known techniques, so that the peak lobes of the sync $t$ symbol signals from successive filters are displaced to appropriate time scale positions.

In addition, the filters are designed with well-known characteristics which limit channel symbol signal overlap. Specifically the precursor lobes, those preceding the peak lobe, of the sync $t$ symbol signal are curtailed when the peak lobe occurs near the beginning of the symbol interval, and the postcursor lobes are curtailed for peak lobes near the end of the symbol interval. Curtailment of lobes which would otherwise spill into intervals occupied by other channel symbol signals not only eliminates intersignal interference, but also eliminates the appreciable time interval, theoretically infinite, that precedes the appearance of the principal lobe of a sync $t$ signal.

Figure 3B:
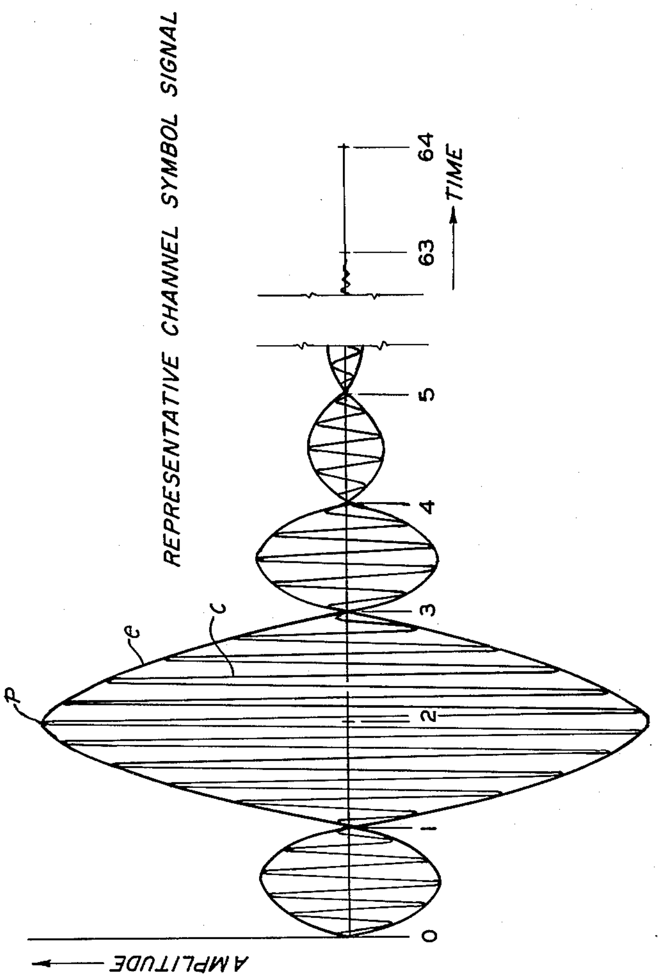
FIG. 3B is a diagram of a channel symbol signal waveform applicable to the encoder of FIG. 3A.

A representative, and curtailed, sync $t$ signal appearing at the output of the modulator 47 for the second channel symbol is shown in FIG. 3B. The effect of the carrier $c$ is to produce a modulated signal whose envelope $e$ is determined by the sync $t$ signal output of the second relay-selected filter F–2 when the binary code word in the converter 42 is, as postulated, 0000001; it is observed that the peak, $p$, of the sync $t$ signal in FIG. 3B occurs at the point denoted "2" on the time scale, thereby indicating that this channel symbol signal represents the second binary code word.

The modulated signal is subsequently applied to the transmision channel C of FIG. 1. While traversing the channel, the signal may be subjected to disturbance effects, which can alter the time-scale location of its peak lob $p$ and, under some circumstances, invert the phase of its carrier $c$. Of the alterations in the modulated signal that can take place during transmission, the least likely is that the signal will be converted into its inverted phase counterpart with the time-scale location of its peak lobe unaltered. Hence, the likelihood that all of the error-correcting signals, associated with a channel symbol signal, will be recovered in error is minimized if the error-correcting code corresponding to a negative polarity channel symbol signal be complementary to the code corresponding to the positive polarity counterpart of the symbol signal. The invention attains this by the clamping network 50 with individual clamping units 51–1 through 51–6 in the outputs of the series-to-parallel converter 42 in FIG. 3A.

Controlling the clamping units is a buffer 52, which serves to adjust the various clamping levels. In addition, to compensate for the time delays introduced by the clamping action, individual delay units 53–1 through 53–7 are associated with the various relays $R_1$ through $R_7$. The clamping units 51–1 through 51–6 become operated only when there is a "1" in the seventh stage of the converter 42, indicating that the bits in the other stages are to be transformed into a negative polarity, biorthogonal channel symbol signal. Otherwise, as described previously, for positive polarity channel symbol signals, the transfers $r_{1-1}$ through $r_{6-1}$ of the switching tree are operated directly according to the settings of the first six of the seven stages in the converter.

When the clamping units respond, the first six relays $R_1$ through $R_6$ sense the complements of the signals in the first six stages of the converter 42. Thus, a "1" is sensed as a "0" and vice versa, so that the previously considered code word, with a "1" in its seventh position i.e., 1000001, appears to the first six relays $R_1$ through $R_6$, because of the clamping action, as the complementary word 1111110. Consequently, a word 1111110, which could be taken for the originally considered code word 0000001, when all of its bits are in error, is interpreted by the relays as 1000001. Thus, the channel symbol signal associated with the word 1111110 is like that of the complementary word 0000001, except for the inversion in phase in consequence of the closure of normally open contacts in a transfer $r_{7-1}$ which place an inverter 55 in the path extending from the switching tree 41 to the modulator 47. Since there is little likelihood that all of the error-correcting signals, associated with an erroneously recovered channel symbol, will also be in error, an appropriate burst-error correcting code need be capable of correcting a cluster of six errors, rather than a cluster of seven.

At the receiver 100 the channel symbol signals dispatched from the transmiter 10 by way of an intervening channel C are initially decoded to recover received counterparts of the originally encoded algebraic code signals.

Figure 4:
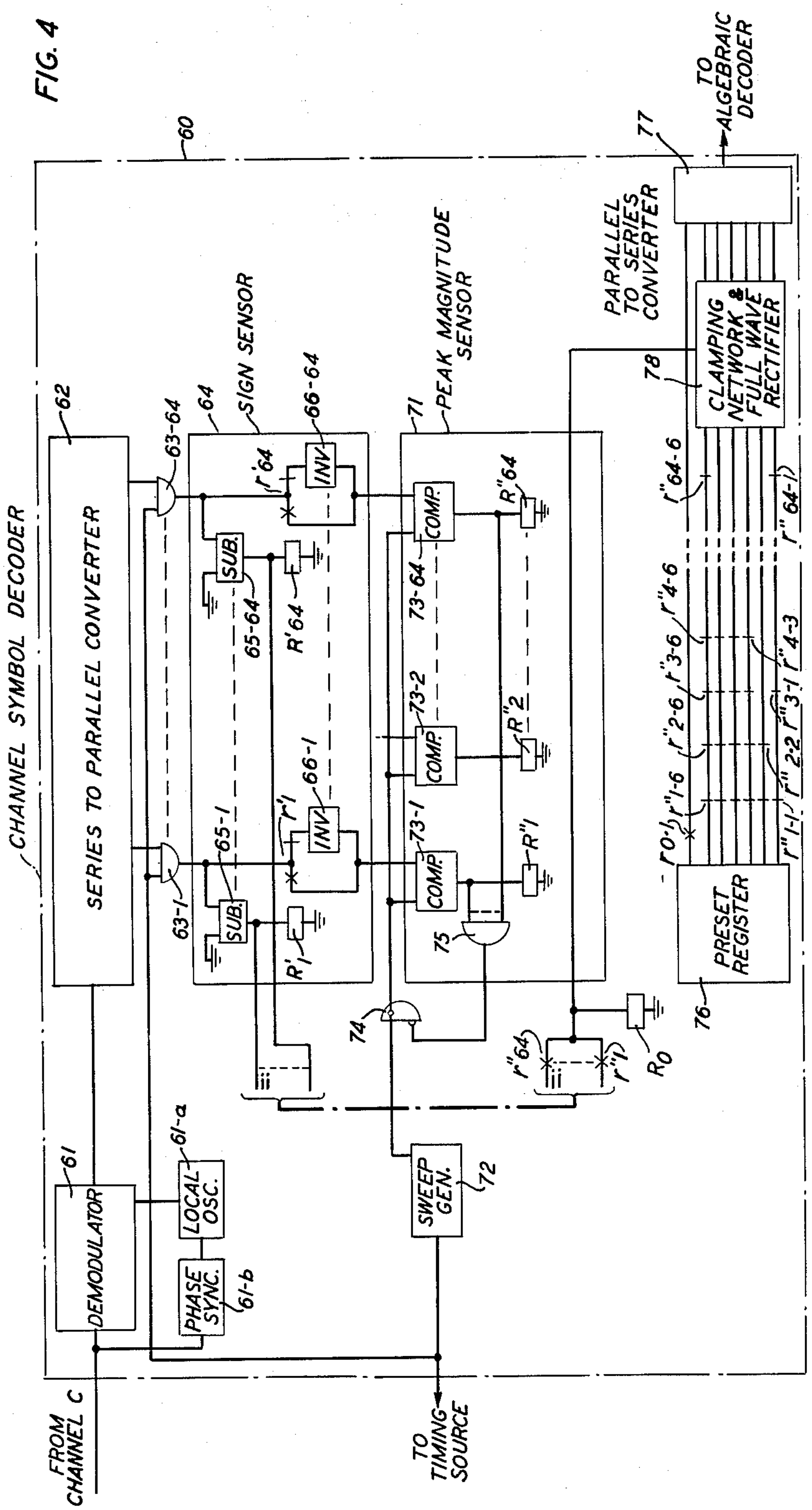
FIG. 4 is a block and schematic diagram of a channel symbol decoder for the system of FIG. 1.

Decoding of the channel symbol signals entails their conversion by a channel symbol decoder 60 into a form facilitating transformation into appropriate groups of algebraic code signals. Initially, as shown in FIG. 4, each channel symbol signal is recovered from its carrier by a demodulator 61, after which it is converted into sixty-four samples by a series-to-parallel converter 62. Then the sign and location of the peak magnitude sample are determined by respective sensors 64 and 71 and used to control the output of a preset register 76. Finally, since an algebraic decoder conventionally operates upon serial information, the output of the preset register is placed in a form appropriate for the algebraic decoder by the action of a parallel-to-series converter 77.

In the recovery of a symbol signal from its carrier, the demodulator 61 is controlled by a local oscillator 61–*a* whose phase is appropriately adjusted, in well-known fashion, through the use of a phase synchronizer 61–*b*. The latter takes account of the phase reversal in the modulated carrier that occurs when a symbol signal changes sign and allows correct recovery of its positive and negative portions.

Sampling of a demodulated symbol signal is controlled by a timing source (not shown) which operates AND gates 63–1 through 63–64 at the outputs of the series-to-parallel converter 62. The signs of these samples, at sixty-four positions corresponding to the possible peak lobe locations of the sync *t* symbol signals, are determined by the sign sensor 64 which also provides the magnitude sensor 71 with amplitude levels that are unaccompanied by sign information. Indications of sign are obtained with subtractors 65–1 through 65–64 whose outputs control a sign relay $R_1'$ through $R_{64}'$ to operate transfer switches $r_1'$ through $r_{64}'$ and provide direct access to the magnitude sensor 71 when the converter outputs are positive and access through inverters 66–1 through 66–64 when negative. One of the sign relays $R_1'$ through $R_{64}'$ also is able to energize relay $R_0$ to close open contacts $r_0$ in one of the output leads of the preset register 76.

At the magnitude sensor 71 the samples derived by way of the sign sensor 64 are compared with the output of a sweep generator 72. Under the control of a timing source (not shown), the output of the sweep generator linearly decreases in amplitude from the maximum anticipated lobe levels of the channel symbol signals. At the first instant in each channel symbol signal period that the sweep amplitude corresponds to the sample amplitude at the input of any of 64 individual comparators 73–1 through 73–64, that comparator responds by energizing an associated relay R″, closing one of the transfers $r_1''$ through $r_{64}''$. The energized comparator also activates an inhibit gate 74 through an OR gate 75 to block further sweep action. The operation of relay R″ also determines which of the register output leads will be able to produce a signal manifestation at the parallel-to-series converter 77 through a clamping network 78. The clamping network 78, which is like that of clamps 51 in FIG. 3A except for the inclusion of full-wave rectification, is operated from a load connected to the sign relay $R_0$. For example, when the relay $R_2''$ associated with the second comparator 73–2 is energized, all leads of the preset register 76, except the first, are interrupted. In addition, if the sign relay $R_0$ is energized, the first lead is closed from the preset register 76 to the converter 77. Thus, when relay $R_2''$ is energized, the output of the preset register 76, having been preset with "1's" becomes 0000001. On the other hand, if the sign relay $R_0$ is also energized, the clamping network 78 is operated and the input to the parallel-to-series converter 77 becomes 1111110.

It is to be noted that unlike the way in which decoding is performed on a bit-by-bit basis, the channel symbol decoder 60 of FIG. 4 does not make a decision as to the content of the received information without considering all of the information available within each interval by a channel symbol signal. Consequently, the probability of error is less than that normally attending conventional binary signal decoding because a larger noise or disturbance in the transmission channel is needed to shift the location of the channel symbol signal's peak lobe than to change a binary bit from a 1 to a 0 or vice versa.

After having decoded the channel symbol signals, the resulting binary signals are applied to a binary algebraic decoder 80 where further error-correction takes place. As noted earlier, the algebraic decoder can be of a well-known variety, desirably possessing a burst error-correction capability.

However, to achieve even greater coding efficiency than that obtainable with conventional burst error-correcting codes, the invention provides a matrix code for the algebraic encoder 20 at the transmitter and the counterpart decoder 80 at the receiver.

A matrix code is so designated because its error-correcting constituents are derived on the basis of a matrix arrangement of its informational constituents. In a representative matrix code group there are 63 bits. Of these, the first 49 arise from 7 source code words of 7 bits each. The remaining 14 bits of the group are redundant. They form two error-correcting words, of 7 bits each, obtained by arranging the information bits into a 7 by 7 matrix and performing a modulo 2 addition, that is, regular binary addition without the carry, of the matrix columns and diagonals. It is to be noted in the 7 by 7 matrix shown in FIG. 5B that each diagonal contains 7 bits, no two of which are in the same row or in the same column of the 7 by 7 matrix. Further in modulo 2 addition, an even number of "1's" becomes a "0" and an odd number becomes a "1."

Figure 5B:
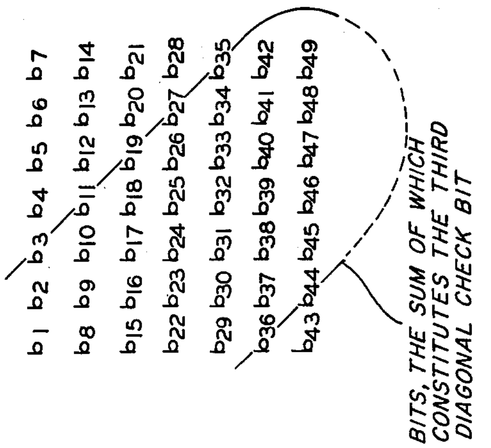
FIG. 5B is a diagram of a seven by seven matrix of 49 information bits.
Figure 5A:
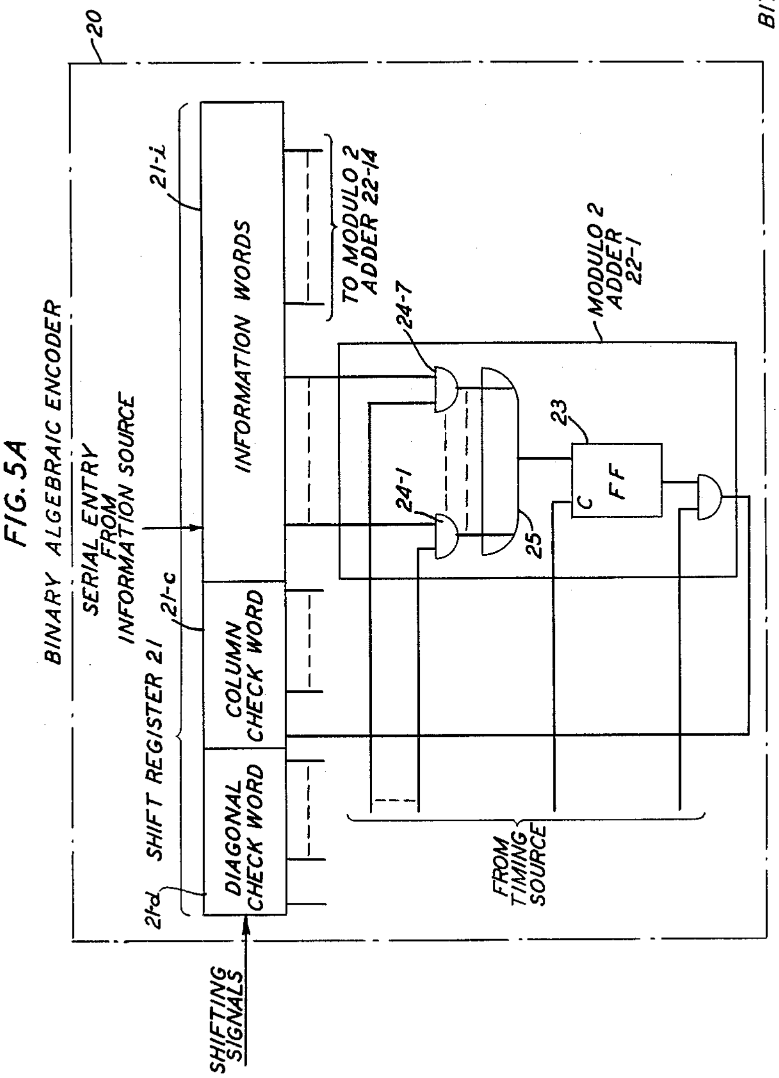
FIG. 5A is a block and schematic diagram of a binary algebraic ecoder for the system of FIG. 1.

With reference to FIGS. 5A and 5B and considering an encoder 20 for a 63 bit matrix code, information bearing binary bits from a source serially enter a shift register 21 under the control of a shifting signal. After 49 information bits have entered the register, the storage positions of the register corresponding to each diagonal and each column are monitored by separate modulo 2 adders 22–1 through 22–14, of which one is shown in detail, in order to derive column and diagonal check bits which are entered into diagonal and column prefix portions 21–*d* and 21–*c* of the storage register. Specifically illustrated is the derivation of the check bit for the first column created when the information bits are disposed in a 7 by 7 matrix. Such a matrix can be represented in the fashion shown in FIG. 5B for which the first 7 information bits form the first row of the matrix and succeeding rows, all parallel with the first, are formed by succeeding sets of 7 bits. From FIG. 5B it can be seen that the first check bit of the column check word is obtained by the modulo 2 addition of information bits $b_1$, $b_8$, $b_{15}$, $b_{22}$, $b_{29}$, $b_{36}$, and $b_{43}$ in the first column of the matrix. Similarly the first bit of the diagonal check word is obtained by the modulo 2 addition of the bits $b_1$, $b_9$, $b_{17}$, $b_{25}$, $b_{33}$, $b_{41}$, and $b_{49}$ arranged on the principal diagonal of the matrix. Other diagonal check bits are obtained along diagonals so that, for example, the third diagonal check bit stems from the modulo 2 addition of the elements along the diagonal path extending from the third information bit $b_3$ through the 35th $b_{35}$ and including the 36th and 44th bits $b_{35}$ and $b_{44}$.

In specific detail each modulo 2 adder, as shown by adder 22–1, contains a flip-flop 23, i.e., a device whose output changes from one level to another, representative of either a "0" or a "1," in response to each applied input. To activate the flip-flop the appropriate stages of the information portion 21–*i* register, for example, those storing the bits of the first column in the matrix of FIG. 5B are monitored by successive AND gates 24–1 through 24–7 through an OR gate 25 by timing source (not shown) of conventional design. Initially, the flip-flop 23 is set so that its output is in a zero state. Then for each "1" gated to the flip-flop there is a change of state so that its output is either a "1" or a "0" according to the number of "1's" in the collection of information bits from which the check bit is being derived. Subsequently, the output of the flip-flop is monitored through an AND gate to allow entrance of either a "1" or "0" into the appropriate stage in the column checkword portion 21–*c* of the register.

As before, once the information signals are processed by the binary algebraic encoder they are transformed to channel symbol signals and dispatched to the receiver 100, where the channel symbol signals are converted into algebraic code words. When the algebraic code is of the matrix variety, an appropriate algebraic decoder is that of FIG. 6.

Figure 6:
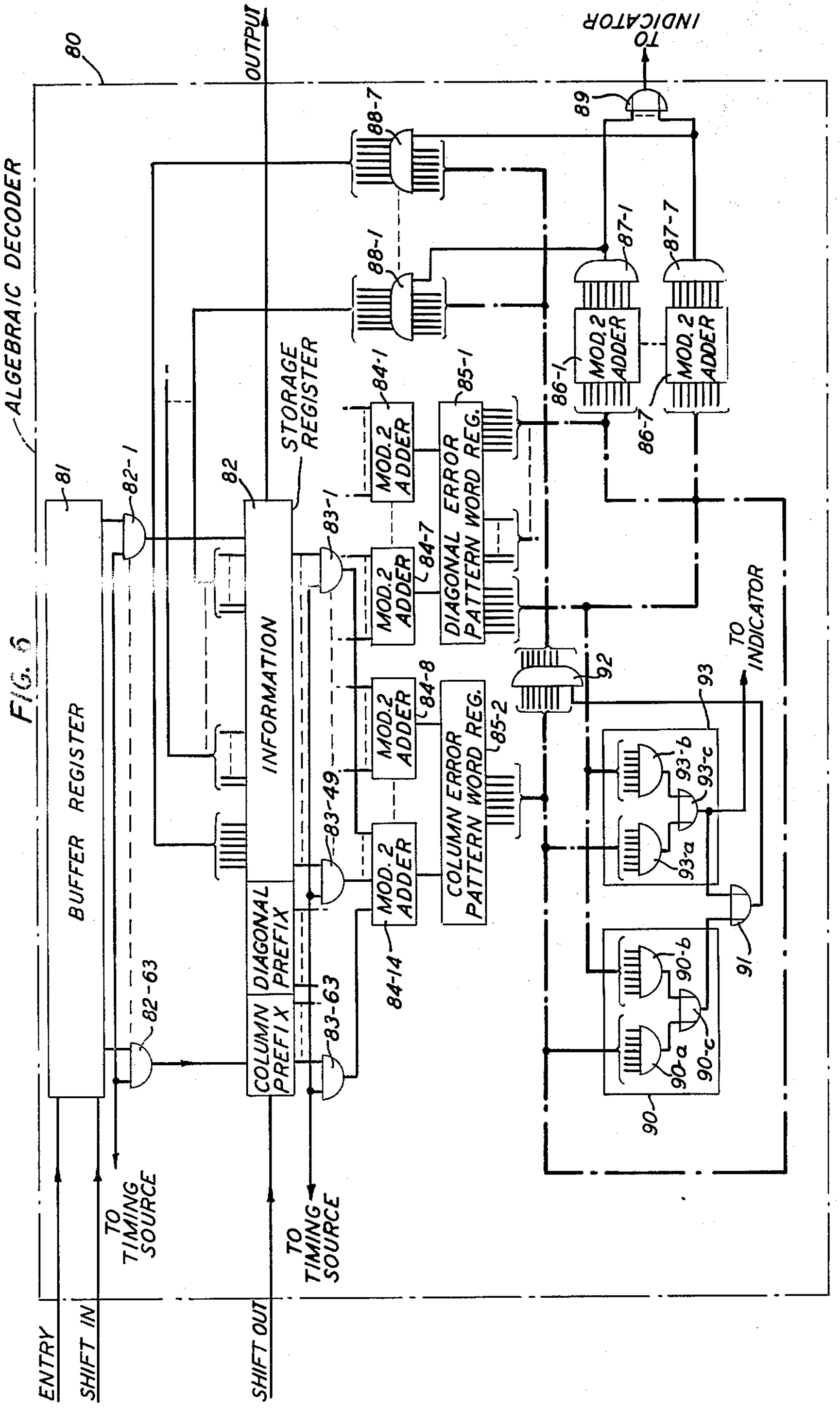
FIG. 6 is a block diagram of a binary algebraic decoder for the system of FIG. 1.

In the algebraic decoder 80 of FIG. 6, error detection-and-correction is accomplished through the use of error pattern words which indicate the occurrences of errors with a high degree of reliability and allow error correction in all but the most unlikely circumstances. With most of the latter, the presence of errors is recognized, even though not corrected.

Figure 7C:
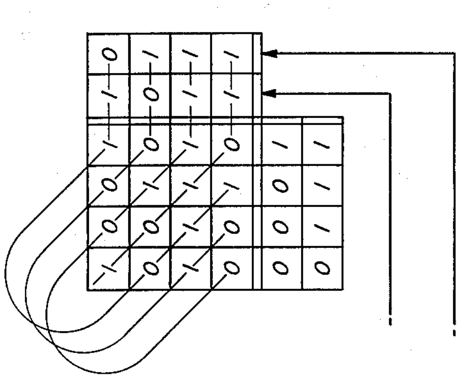
FIG. 7C is a diagram of the code word matrix shown in FIG. 7A with derived column and diagonal check code words, but with the last three bits of code word number 2 erroneously received.
Figure 7B:
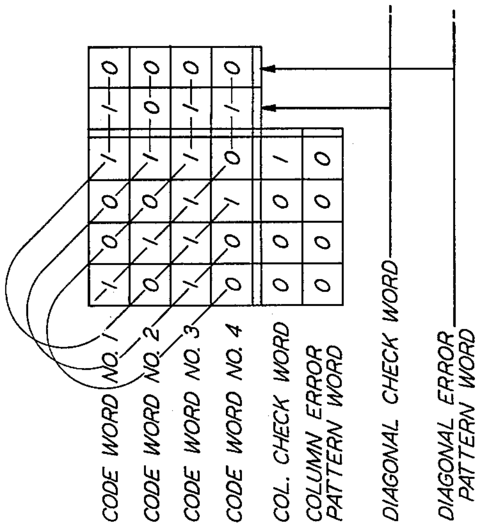
FIG. 7B is a diagram of the code word matrix when correctly received at the receiver with derived column and diagonal check code words.
Figure 7A:
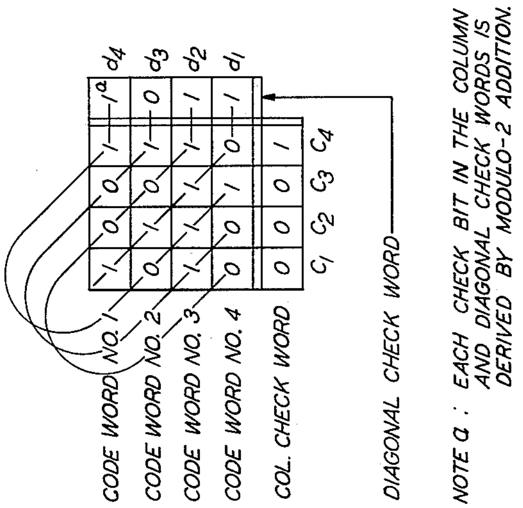
FIG. 7A is a diagram of a code word matrix with derived column and diagonal check code words.

To obtain the error-pattern words, the 63 code bits in the matrix group derived from nine channel symbol signals by decoder 60 corresponding to nine symbol signals, are accumulated in a buffer register 81 and subsequently entered into a storage register 82 through AND gates 82–1 through 82–63. The first forty-nine stages of the registers 81 and 82, from right to left, are occupied by information signals and the remaining fourteen contain check signals. As a first step, the diagonal and column error pattern words are derived, when AND gates 82–1 through 83–63 are operated and using modulo 2 adders 84–1 through 84–14, in the same fashion that the check words were obtained at the encoder of FIG. 5A, with the additional feature that each bit in the received check words is also included in the modulo 2 addition with the column or diagonal from which it was originally derived in the algebraic encoder 20. The resulting error pattern words are stored in associated registers 85–1 and 85–2. If the error pattern words had not included the received check bits, they would merely constitute derived check words, which would then require comparison with the received check words in order to determine correspondence or lack of correspondence. By including the received check words in the derivation of the error pattern words, correspondence or lack of correspondence is immediately indicated by the error pattern words, since in the case where a derived check word and a received check word fail to correspond, a register 85 contains "1's"; it contains "0's" otherwise. FIGS. 7A and 7B illustrate the all zero column error-pattern and diagonal error-pattern words when there are no errors in the received information bearing and check code words.

If there are no errors in the derived channel symbol signals representing the 49 information bits, and at most one error in the two channel symbols representing check bits, at least one of the error pattern words will be constituted entirely of "0's." A gate 90, constituted of AND gates **90–*a* and 90–*b* and OR gate 90–*c*, responds to this condition through an OR gate 91 to operate an inhibit gate 92 and disable the corrective equipment, constituting AND gates 88–1 through 88–7, of the decoder 80**.

In the case of a single error in a channel symbol, other than a channel symbol representing a check word, the column error pattern word will match one of the possible cyclic permutations of the diagonal error pattern word. For each successive permutation, the diagonal error pattern word is like its predecessor except that its first bit is the same as the last bit of the predecessor and all other bits are shifted by one position. The number of permutations needed to make the diagonal error pattern word match the column error pattern word is one less than the row which contains an erroneous bit or bits. Even though a single error in a channel symbol signal can cause up to $n$ bits in the $n$ bit binary word to be in error, the row which contains the error can be identified so long as only $n-1$ or fewer bits are actually in error.

When a single error event occurs, one of the constituent information code words of the matrix code group is in error. The constituent word in error is located by adding the column error-pattern word with the diagonal error pattern word and its successive cyclic permutations in a succession of modulo 2 adders 86–1 through 86–7. The output of only one of the adders 86 will contain all "0's"; the corresponding row of matrix and hence the associated code word, is the one in error. FIGS. 7A and 7C illustrate the working of this invention for the case where the last three bits of the second code word in a group of four 4-bit code words are erroneously received. In particular, in FIG. 7C both the column and diagonal error-pattern words contain binary "1's" indicating an error somewhere in the information bearing code words #1 to #4. One permutation of the diagonal error-pattern word is sufficient to match this word with the column error-pattern word indicating that the second code word (#2) is in error. Modulo-2 addition of the permutated diagonal error-pattern word, 0111, to the erroneously received second code word (#2), 0010, yields the correct code word (#2), 0101.

The "all-zero" condition is detected by the appropriate one of 7 adder AND gates 87–1 through 87–7. The latter, in turn, gates the settings of the column error-pattern word register 85–2 to the information section of the principal storage register 82 through one of 7 composite AND gates 88–1 through 88–7. Each of the latter is an individual AND gate operated by the various outputs of the column-word register 85–2 plus a signal from the corresponding one of the preceding AND gates 87–1 through 87–7. The information section of the principal storage register 82 is divided into seven sections, one for each subgroup of seven information signals representing a code word. Thus, if the indicated error is found in the first word of the principal storage register 82, the settings of the column error-pattern word register 85–2 are applied to the seven flip-flops of the principal register 82 in which the first word is stored to produce changes in their states wherever the column error pattern word register 85–2 indicates "1's."

However, there are two circumstances where a single error indication should not initiate error-correction. The first of these is where the single error concerns a channel symbol signal which is derived from a check word, as opposed to an information word. In such a case error-correction is obviously not needed and the previously described inhibit action initiated by gate 90 is brought into operation.

The second circumstance where a single error should not be accompanied by corrective action arises when all 7 information bits derived from a single, informational channel symbol are themselves in error. Under this circumstance, the outputs of both error pattern registers 85–1 and 85–2 indicate 7 bits in error and a gate 92, constituted of AND gates **93–*a* through 93–*c*, activates the inhibit gate 92** and an indicator (not shown).

Consequently, whenever there is an error in a single channel symbol, which gives rise to errors in fewer than 7 of the information bits associated with the symbol, the invention makes possible the complete correction of the error condition. On the other hand, if a single information chanel symbol error gives rise to errors in all 7 information bits, a highly unlikely circumstance by virtue of the encoding technique considered earlier, error-correction cannot be achieved, but, nevertheless, error-detection can take place.

If an error has occurred in more than one of the channel symbol signals about 95 percent of the time, none of the modulo 2 adders 87–1 through 87–7 associated with the error pattern word register will indicate the "all-zero" condition. In this case the existence of error is detected by an indicator (not shown) that senses the absence of a signal from an OR gate 89.

Thus, the binary algebraic decoder of FIG. 6 permits the detection and correction of all single error events except for the unlikely situation when all 7 of the information bits are in error, in which case the existence of that situation is indicated. And for about 95 percent of the multiple error events an indication to that effect is provided. For the remaining 5 percent, whose probability of occurrence is most unlikely, a failure to detect an error will result in 2 out of 7 information word errors on the average.

Other adaptations and modifications of the invention will occur to those skilled in the art. Under many circumstances it will be appreciated that digital, rather than analog instrumentation will be advantageous.

What is claimed is:

1. Apparatus for the low energy signaling and recovery of information, which comprises means for converting the information into error-correcting groups of code signals, means for generating from said code signals a predetermined plurality of channel symbol signals each having a selected characteristic that occurs at a predetermined point within the time duration of its corresponding subgroup, wherein the location of said predetermined point is determined by the information contained in said subgroup, a transmission medium for said channel symbol signals, means for deriving, from the transmitted channel symbol signals, the most probable counterparts of the generated channel symbol signals, means for deriving reconstructed subgroups of code signals from said most probable counterparts, and means for deriving information from the derived error-correcting groups of code signals, whereby the derived information departs from the original information with a low probability of error despite disturbances on said transmission medium.

2. Apparatus as defined in claim 1, wherein said converting means comprises means for generating binary information signals supplemented by binary check signals.

3. Apparatus as defined in claim 2, wherein said means for generating binary information and check signals comprises means for generating $n^2$ binary information signals supplemented by a sequence of $2n$ binary check signals, where $n$ is the number of binary digits in each subgroup of code signals 4. Apparatus as defined in claim 3, wherein said means for generating binary information and check signals comprises means for generating information signals and supplementing them by check signals that are derived from the columnar and diagonal components of an $n$ by $n$ matrix formed by said information signals.

5. Apparatus as defined in claim 4, wherein said generating and supplementing means comprises means for adding said columnar and diagonal components on a modulo 2 basis.

6. Apparatus comprising means for developing information code signals, means for supplementing said information code signals by redundant code signals to obtain error-correcting groups of code signals, and means for converting said information code signals, as supplemented by said redundant code signals, into channel symbol signals each representing a different selected plurality of said information code signals and said redundant code signals, wherein each channel symbol signal has a selected characteristic that occurs at a predetermined point within the time duration of its corresponding plurality of code signals.

7. Apparatus for representing informational situations by code signals, which comprises means for converting said informational situations into $n^2$ corresponding code signals, means for supplementing each group of $n^2$ code signals by $2n$ redundant code signals to form a group of $n^2+2n$ error-correcting code signals, and means for transforming said group of $n^2+2n$ error-correcting code signals into a plurality of $n+2$ channel symbol signals, wherein each channel symbol signal is derived from a different subgroup of $n$ code signals so that a selected characteristic peak of each channel symbol signal occurs at a point within the time interval occupied by said $n$ code signals determined by the informational situation represented by said $n$ code signals.

8. Apparatus for encoding analog information signals, which comprises means for converting the analog information signals into error-correcting serial sequences of binary code signals, means having a plurality of outputs for converting each of said error correcting sequences from serial to parallel form, a plurality of relays operating transfer switches and individually connected to the outputs of said converting means, a plurality of filters having a corresponding plurality of progressively increasing delays so that upon being energized each filter has an output signal with a peak lobe that occurs at a corresponding different point in time;

an impulse signal generator for energizing said filters, a modulator, and a switching tree constituted of said transfer switches and controlled by said relays for selectively establishing a path from one of said filters to said modulator in dependence upon the combination of code signals entered into said converting means, whereby the output of said modulator is a channel symbol signal.

9. Apparatus for the algebraic decoding of a group of information code signals supplemented by diagonal and column check code signals, which comprises means for storing the group of information and check code signals, subgroups of the information code signals representing rows of a matrix having column and diagonal signals, means for adding the information code signals composing each matrix column together with the check code signal derived from that column and means for adding the information code signals composing each matrix diagonal together with the check code signal derived from that diagonal to form, respectively, subgroups of column-error and diagonal-error signals, means for comparing the subgroup of column-error signals with successive cyclic permutations of the subgroup of diagonal-error signals, each permutation being identified with a row of said matrix, and means responsive to a match of said column-error signals with any permutation of said subgroup of diagonal-error signals for altering, in accordance with said column-error signals, the stored subgroup of said information code signals corresponding to the row of said permutation, thereby to correct a cluster of errors contained within a subgroup of stored information code signals corresponding to said row.

10. Apparatus for algebraically deriving check signals from first code signals representing an analog information signal and for regrouping of said first code signals and said derived check signals into error-correcting time sequences of second code signals, which comprises storing means for arranging said first code signals to form the row, column and diagonal elements of a square matrix, means for adding the column elements of said matrix to derive column check signals, means for adding the diagonal elements of said matrix to derive diagonal check signals, and means for entering said column check signals and said diagonal check signals into said storing means, thereby to provide a capability for the correction of a cluster of errors within a time sequence of said first code signals representing an analog input signal.

11. Apparatus for recovering the most probably generated counterpart of an incoming channel symbol signal, which comprises means for sampling the incoming channel symbol signal at various uniformly spaced time positions over its duration to derive a plurality of samples, means for retaining said plurality of samples and for indicating the time location of the retained sample of peak magnitude, means for determining the polarity of the indicated sample of peak magnitude, a register that is preset with a plurality of prescribed signal conditions any one combination of which may be presented by said channel symbol signal, and means in circuit relation with said register, controlled by the time location and polarity of the sample of peak magnitude from said indicating and determining means, for selecting the one most probable combination of said prescribed signal conditions in said register represented by said channel symbol signal.

References Cited by the Examiner

UNITED STATES PATENTS

| | | | |
|---|---|---|---|
| 2,732,424 | 1/1956 | Oliver. | |
| 2,975,228 | 3/1961 | Doty et al. | 340—146.1 |
| 2,977,047 | 3/1961 | Bloch | 235—153 |
| 3,008,003 | 11/1961 | Schwenzfeger | 340—146.1 |
| 3,008,004 | 11/1961 | Young | 340—146.1 |
| 3,008,005 | 11/1961 | Barry et al. | 340—146.1 |
| 3,063,636 | 11/1962 | Sierra | 340—146.1 |
| 3,078,443 | 2/1963 | Rose | 235—153 |
| 3,079,597 | 2/1963 | Wild | 235—153 |
| 3,093,707 | 6/1963 | Nicholson et al. | 340—146.1 |

OTHER REFERENCES

Richards: Arithmetic Operations in Digital Computers (Mar. 17, 1955), D. Van Nostrand Company, Inc., New York, N.Y., pp. 187 to 188.

ROBERT C. BAILEY, *Primary Examiner.*

MALCOLM A. MORRISON, *Examiner.*

M. A. LERNER, *Assistant Examiner.*